Patented Feb. 21, 1939

2,148,079

UNITED STATES PATENT OFFICE 2,148,079

MOLD FOR MAKING PLIABLE PLASTIC ARTICLES

Henry Martin, Jr., Wadsworth, Ohio, assignor to The B. F. Goodrich Company, New York, N. Y., a corporation of New York Application July 23, 1936, Serial No. 92,078

3 Claims. (Cl. 18—42)

This invention relates to molds such as are used in molding rubber compositions or other plastic materials.

Heretofore it has been customary to provide molds for forming rubber or other plastic articles. Such molds are usually machined from chilled iron or steel and are made of parts fitted together and held in place by suitable dowel pins and dowel holes. It is also customary to form in the mold parts around the article cavities, and spaced therefrom an overflow cavity of small cross-sectional area. In the use of such molds, a body of the plastic material is inserted in each article cavity and the molds are closed under pressure and while heat is applied thereto. The body of composition must be in slight excess of the area of the article cavity and the excess flows between the mold plates filling the overflow cavities. After vulcanization of the article the rind or flash, including any material within the overflow cavity or between the mold plates, is trimmed from the article by means of shears or circular shear cutters at considerable labor expense.

The principal objects of this invention are to eliminate hand trimming by forming a tear strip adjacent the article of sufficient strength to permit tearing it from the article without breaking of the tear strip, and separated from the article by an extremely thin web formed with a determinate line of tear located so close to the article as to leave a closely trimmed article when removed therefrom. Other objects are to provide an improved mold structure, to eliminate trimming mechanism, and to provide minimum cost of manufacture.

Other objects will appear from the following description and the accompanying drawing.

Figure 1:
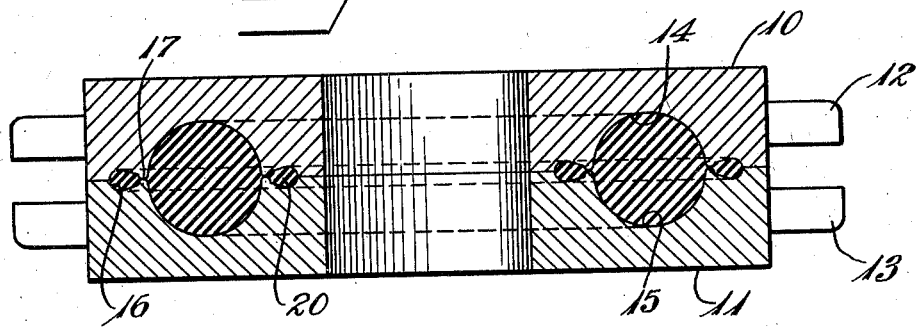
Fig. 1 is a vertical cross sectional view of a mold showing the invention in its preferred form with the formed article therein, the particular article and mold being merely illustrative of mold construction which may be applied to molds for forming articles of other forms.
Figure 2:
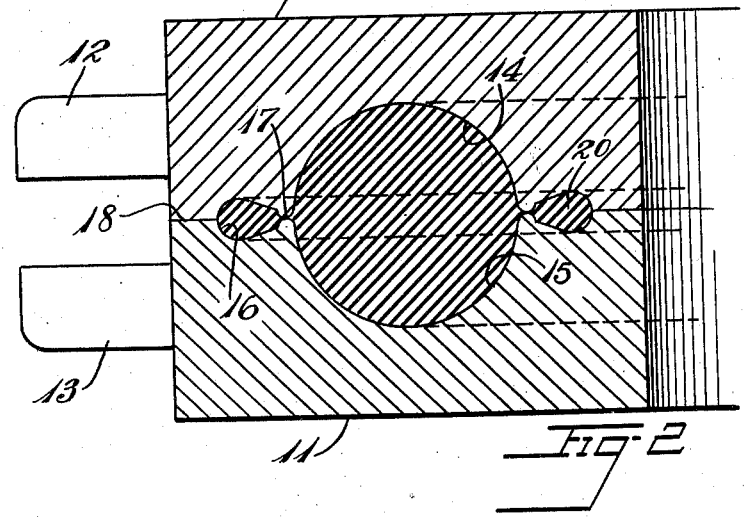
Fig. 2 is an enlarged similar view showing only a part of the mold.
Figure 3:
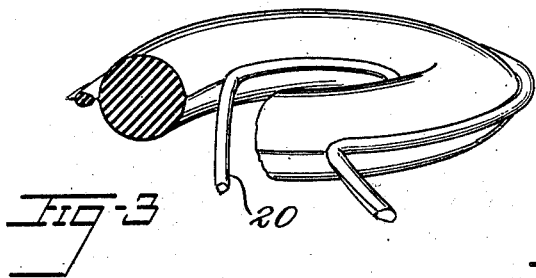
Fig. 3 is a perspective view showing the article removed from the mold and the tear strip partially torn therefrom, part of the article being broken away for illustrative purposes.

Referring to the drawing, the mold chosen for illustrating the invention comprises a pair of rigid metal plates 10, 11, held in alignment in face to face relation by suitable dowels and dowel holes, not shown. Breaking lugs 12, 13 are provided to aid in separating the plates when an article is to be removed therefrom.

In order to provide a molding cavity of ring form in the mold illustrated, the plates are machined on their meeting faces to provides mating cavities 14, 15. In certain molds it may be necessary or desirable to form the cavity entirely in one plate, as will be understood by those skilled in the art.

In order to provide for overflow of material and at the same time to determinately form a tear strip of sufficient strength along the article, a tear strip cavity 16 is formed between the plates and spaced from the article cavity by a narrow land 17, a much wider land 18 being provided outside the strip cavity to bear the pressure applied to the mold without placing the narrow separating land under excessive pressure. The land 17 is preferably made no greater than one sixteenth of an inch in width and is preferably rounded or chamfered so as to provide a narrow blunt edge to contact with the face of the other mold part. Both plates may be provided with such rounded chamfered lands meeting each other. The arrangement is such that an article and an adjacent tear strip may be molded from a single mass of composition in a single operation and the tear strip will be separated by a narrow flash of thin material having a determinate line of tear fixed by its inherent weakness along a determinate line.

Where the article is a ring, as shown, a second tear strip 20 may be formed along the other edge of the cavity.

In using the mold, a mass of unvulcanized rubber composition or other plastic of greater cubical content than the article cavity, and preferably of no greater cubical content than the article cavity plus the tear strip cavities, is placed between the heated mold plates. Pressure is applied to the mold plates to bring them face to face and thereby to fill the article cavity and at least substantially fill the tear strip cavity. The pressure brings the respective lands into approximate contact with each other.

After vulcanization, and before the article has cooled, the tear strip is grasped and torn from the article along the determinate line of least thickness of the flash between the tear strip and the article.

I claim:

1. A mold for forming pliable articles from plastic material, said mold comprising a plurality of rigid mold members, each formed to provide portions of a closed article cavity and an adjacent closed tear strip cavity, the article and tear strip cavities being separated by narrow lands having rounded opposing faces for forcing the material into rounded concave channel form at the opposite sides thereof with the deepest parts of the rounded channels in opposition to provide a very thin narrow zone along the same capable of being torn along a regular determinate line.

2. A mold for forming pliable articles from plastic material, said mold comprising a plurality of rigid mold members, each formed to provide portions of a closed article cavity and an adjacent closed tear strip cavity, the article and tear strip cavities being separated by narrow lands not exceeding about one-sixteenth of an inch in width having rounded opposing faces for forcing the material into rounded concave channel form at the opposite sides thereof with the deepest parts of the rounded channels in opposition to provide a very thin narrow zone along the same capable of being torn.

3. A mold for forming pliable articles from plastic material, said mold comprising a plurality of metal members formed to provide between them a closed article cavity and an adjacent closed tear strip cavity, the article and tear strip cavities being separated by cooperating portions on the mold members at least one of which comprises a narrow land having a rounded face for forcing the material into rounded concave channel form to provide a very thin narrow zone along the same capable of being torn along a regular determinate line.

HENRY MARTIN, Jr.